No. 664,399. Patented Dec. 25, 1900.
R. P. GERLACH & F. STAHL.
STAVE SAWING MACHINE.
(Application filed Mar. 24, 1900.)
(No Model.) 7 Sheets—Sheet 1.
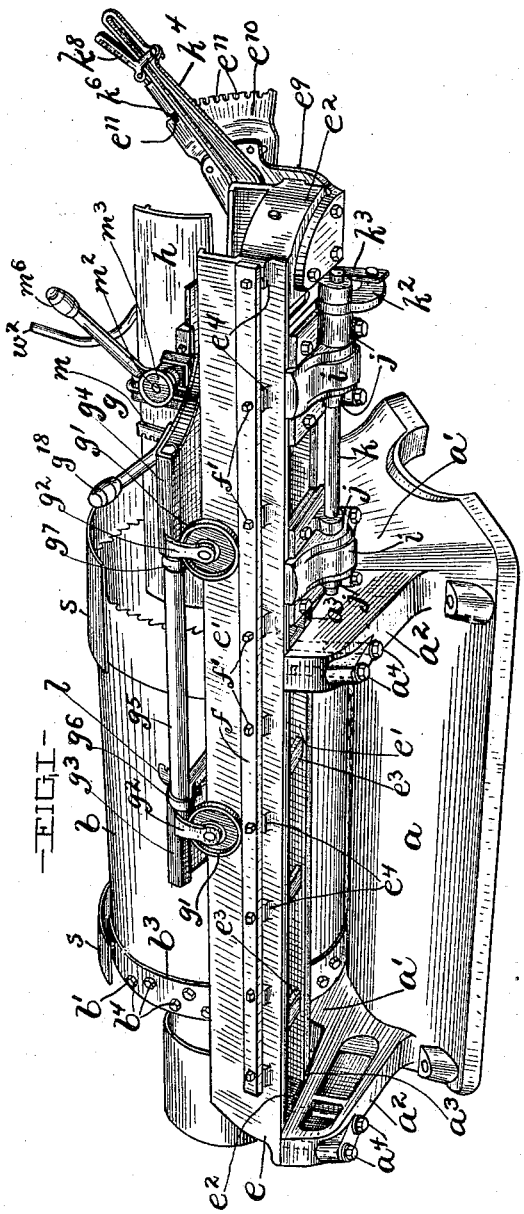
WITNESSES:
Daniel E. Daly.
A. H. Parratt.
INVENTORS
Rudolph P. Gerlach
and Frank Stahl
BY Lynch & Dorer
their ATTORNEYS No. 664,399. Patented Dec. 25, 1900.
R. P. GERLACH & F. STAHL.
STAVE SAWING MACHINE.
(Application filed Mar. 24, 1900.)
(No Model.) 7 Sheets—Sheet 2.
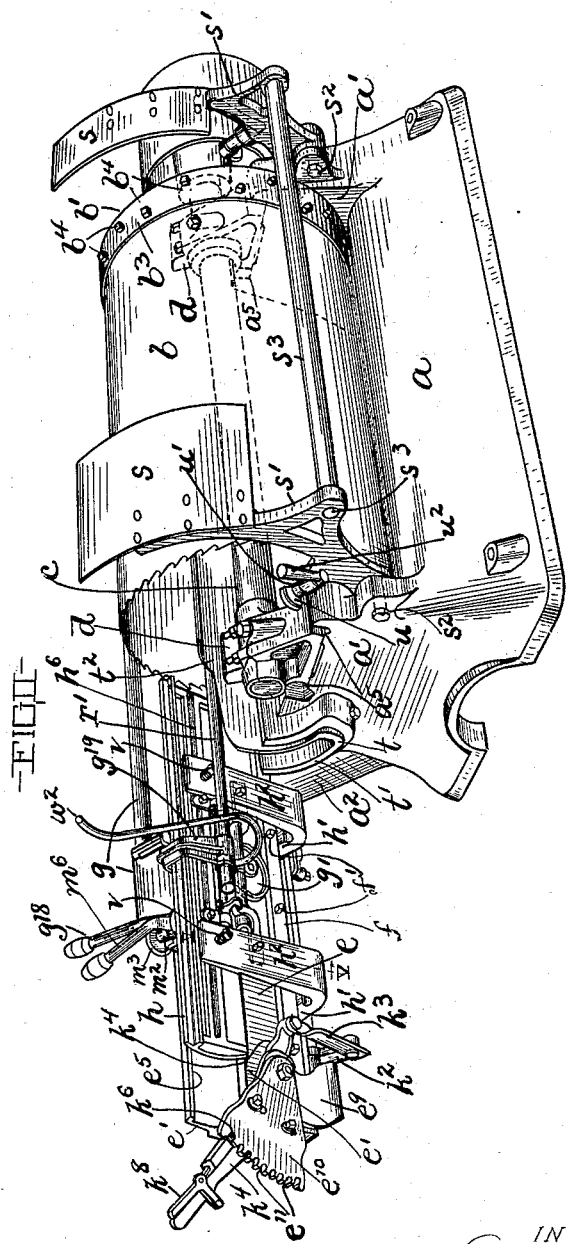
WITNESSES:
Daniel E. Daly.
A. H. Parratt
INVENTORS
Rudolph P. Gerlach
and Frank Stahl
BY Lynch & Norris
their ATTORNEYS

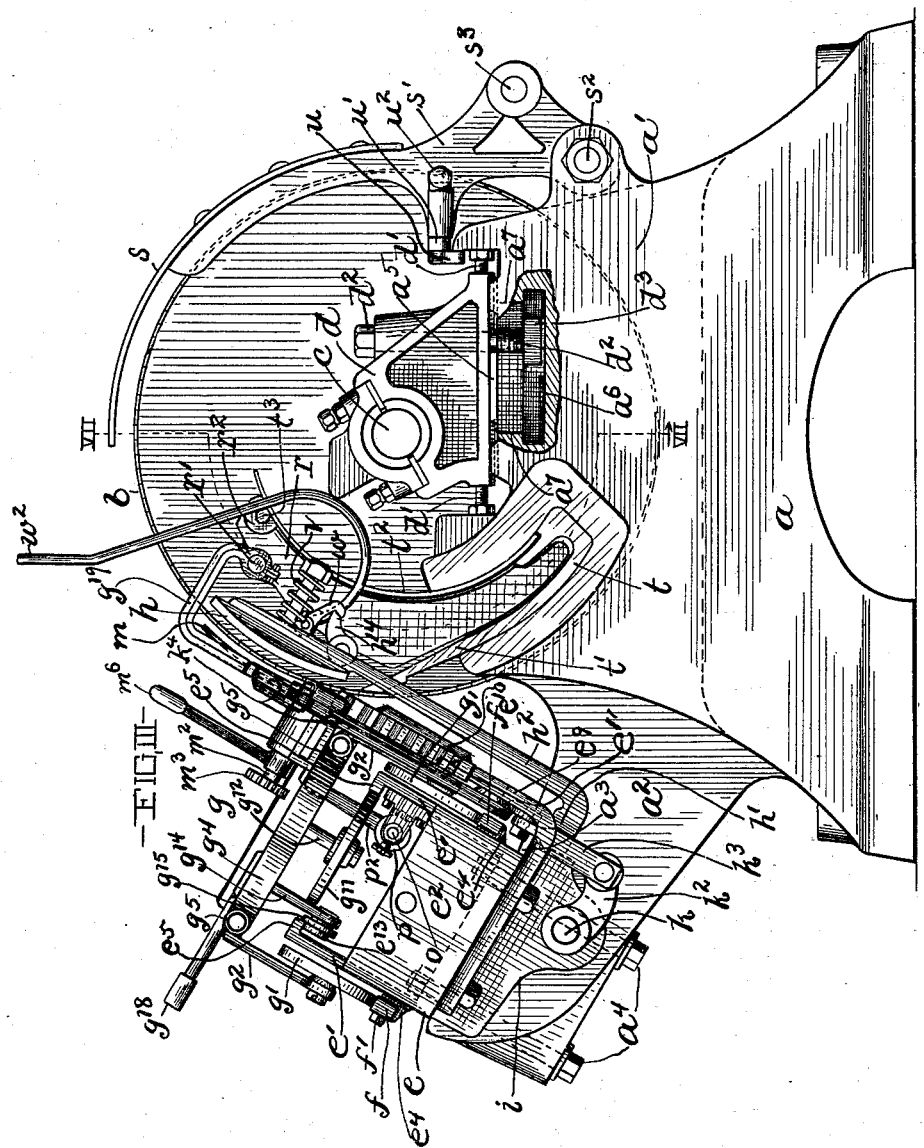

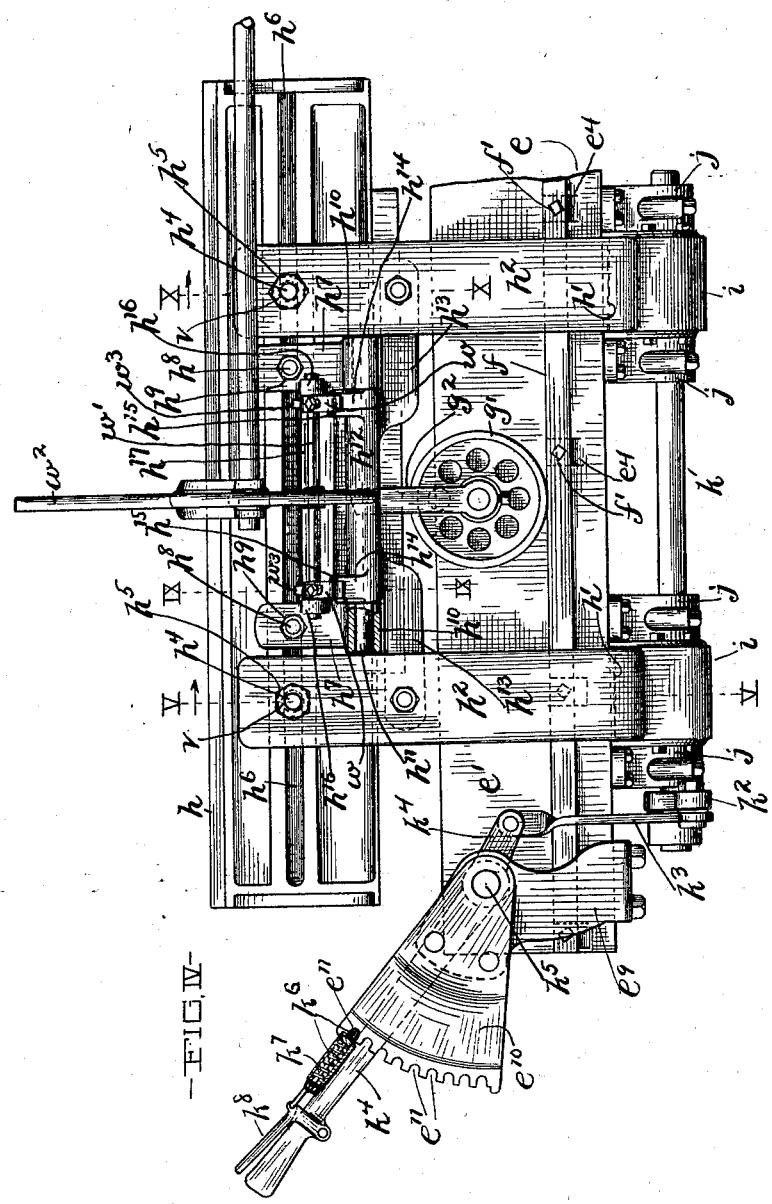

No. 664,399. Patented Dec. 25, 1900.
R. P. GERLACH & F. STAHL.
STAVE SAWING MACHINE.
(Application filed Mar. 24, 1900.)
(No Model.) 7 Sheets—Sheet 5.
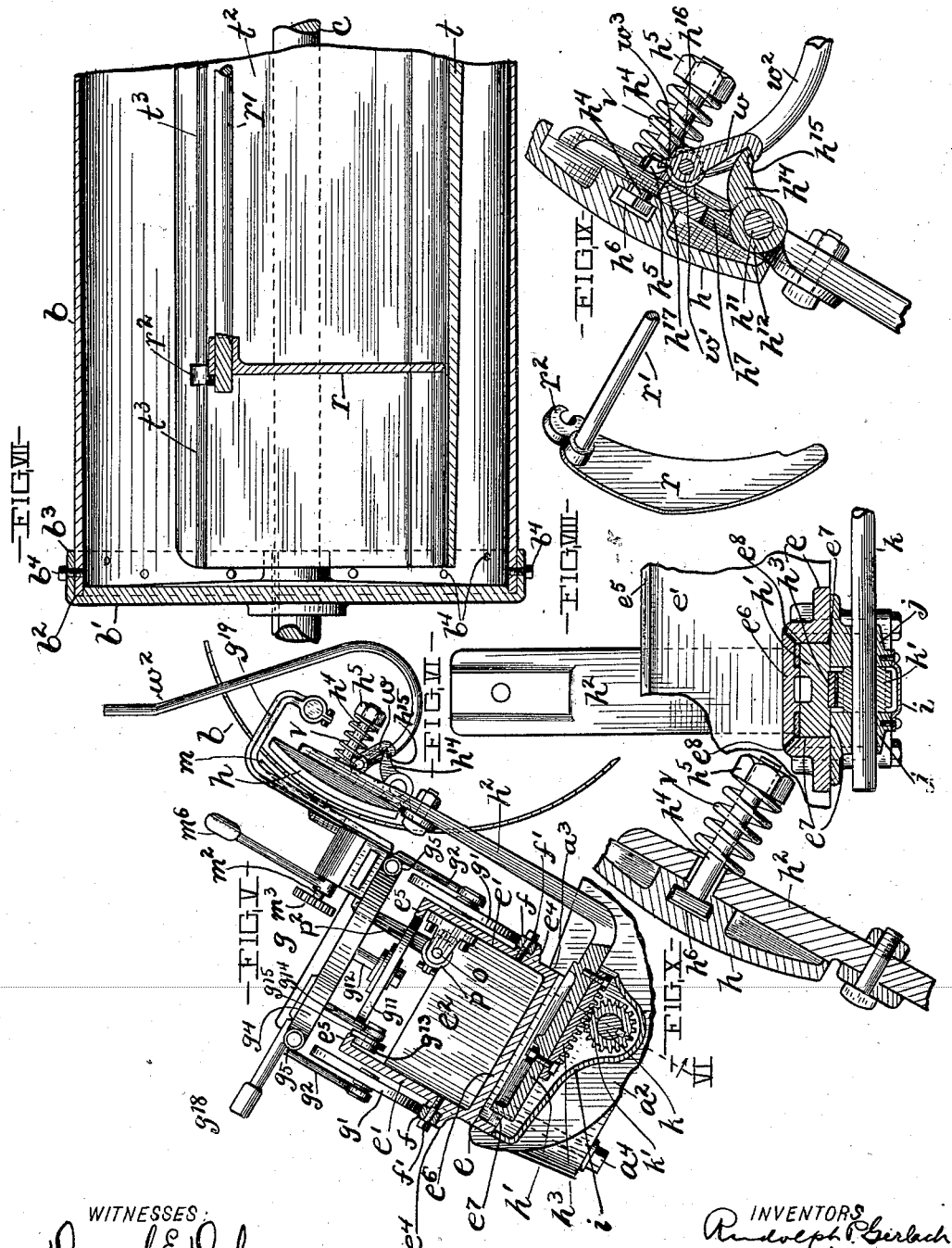
WITNESSES
Daniel E. Daly.
A. H. Parrett
INVENTORS
Rudolph P. Gerlach
and
Frank Stahl
BY
Lynch & Worer
their ATTORNEYS No. 664,399. Patented Dec. 25, 1900.
R. P. GERLACH & F. STAHL.
STAVE SAWING MACHINE.
(Application filed Mar. 24, 1900.)
(No Model.) 7 Sheets—Sheet 6.
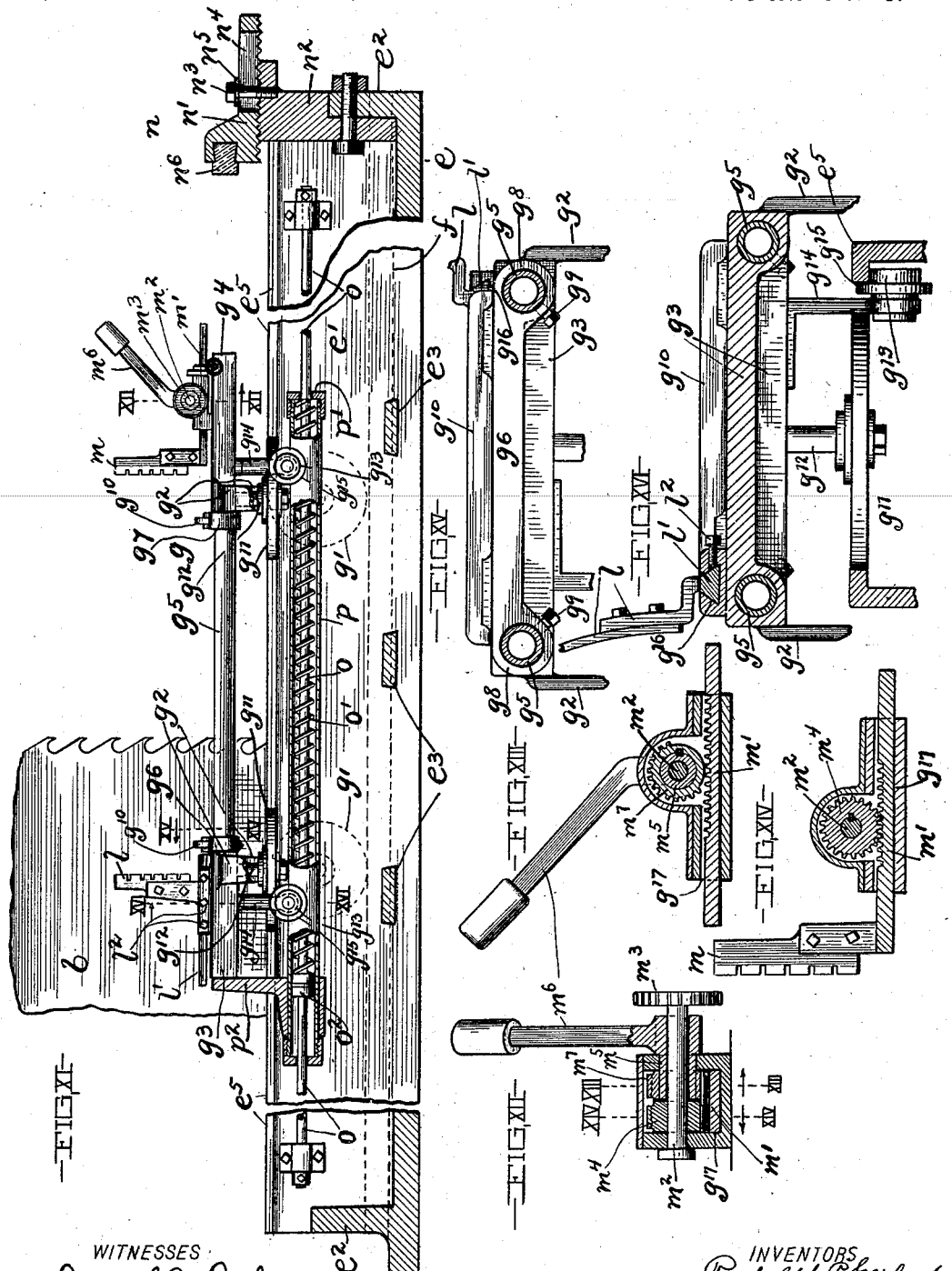
WITNESSES
Daniel E. Daly.
A. H. Garratt
INVENTORS
Rudolph P. Gerlach
and
Frank Stahl
Synnel & Dorer
their ATTORNEYS No. 664,399. Patented Dec. 25, 1900.
R. P. GERLACH & F. STAHL.
STAVE SAWING MACHINE.
(Application filed Mar. 24, 1900.)
(No Model.) 7 Sheets—Sheet 7.
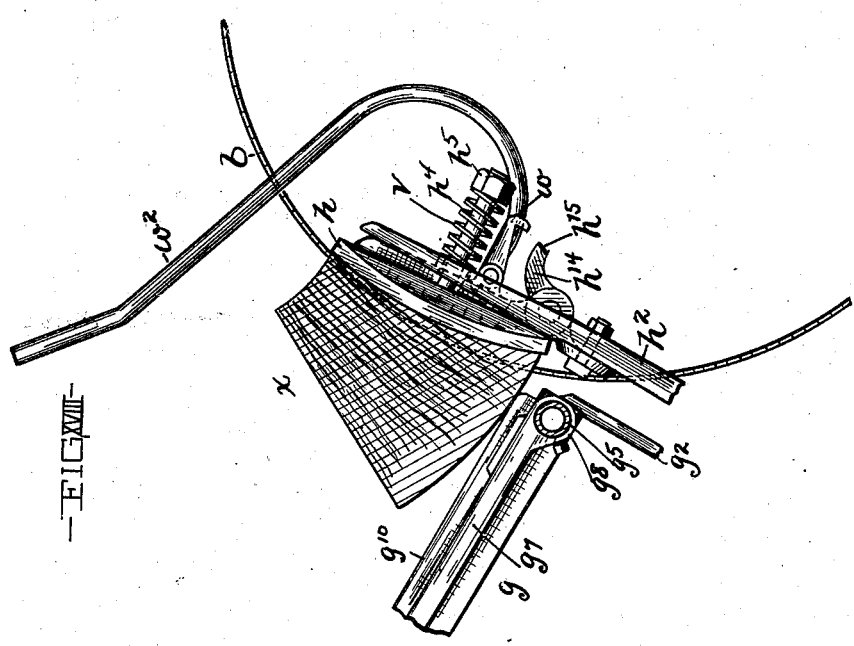
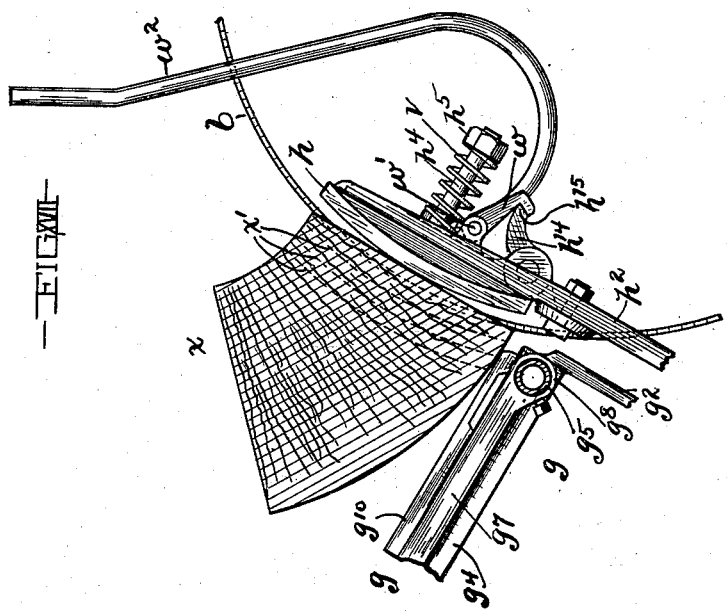

UNITED STATES PATENT OFFICE.

RUDOLPH P. GERLACH, OF CLEVELAND, AND FRANK STAHL, OF LAKEWOOD, OHIO.

STAVE-SAWING MACHINE.

SPECIFICATION forming part of Letters Patent No. 664,399, dated December 25, 1900.

Application filed March 24, 1900. Serial No. 9,981. (No model.)

*To all whom it may concern:*

Be it known that we, RUDOLPH P. GERLACH, a resident of Cleveland, and FRANK STAHL, a resident of Lakewood, in the county of Cuyahoga and State of Ohio, have invented certain new and useful Improvements in Stave-Sawing Machines; and we do hereby declare the following to be a full, clear, and exact description of the invention, such as will enable others skilled in the art to which it pertains to make and use the same.

Our invention relates to improvements in machines for sawing staves from bolts of wood, and more especially to a machine of the character indicated, comprising a cylinder-saw.

One object of our invention is to reduce the weight of machines of the character indicated and to render the different parts thereof more conveniently accessible than heretofore.

Another object of the invention is to provide improved means for preventing displacement of the bolt-carriage upon the track along which it is propelled during the stave-sawing operation.

Another object of the invention is to provide an improved gage for predetermining the thickness of the stave that is to be sawed from the bolt operated upon.

Another object of the invention is to provide mechanism whereby the gage employed in predetermining the thickness of the stave is rendered capable of being tilted as required to enable the operator to saw away wedge-shaped or angular pieces from the bolt that is to be converted into staves, so as to saw the bolt at all times during the conversion of the bolt into staves on lines approximately or nearly radial of the bolt and as nearly in line with the grain of the wood as is practicable and produce staves that are more durable than would be the case if sawing of the bolt approximately radially of the bolt were not so closely observed.

Another object of the invention is to support the stave-thickness-controlling gage from a carriage that is supported from the same frame that bears the bolt-carriage, so that the bolt-carriage and the stave-carriage are always in the required relative position.

Another object of the invention is not only to form the frame that carries the bolt-carriage and the gage-carriage rigid with the bed that bears the cylinder-saw, but to have the saw adjustable toward and from the bolt-carriage, so that no displacement or disturbance of the bed will result in the disturbance of the desired relative adjustment of the saw, bolt-carriage, gage-carriage, and the members or devices connected with the said parts.

With these objects in view and to the end of realizing other advantages hereinafter appearing our invention consists in certain features of construction and combinations of parts hereinafter described, and pointed out in the claims.

In the accompanying drawings, Figures I and II are views in perspective of a machine embodying our invention. Fig. III is a forward end elevation of the machine, partly in section. Fig. IV is a side elevation of a portion of the bolt-carriage and the frame that supports the latter and shows more particularly the back side of the stave-thickness-regulating gage and mechanism for adjusting the gage. Fig. V is an end elevation, largely in vertical section, on line V V, Figs. II and IV. Fig. VI is an inner side elevation, partly in section, of a gage-bearing arm of the gage-carriage and the operative connection between the gage-carriage at the lower end of the said arms with the lever-operated shaft employed in the adjustment of the gage radially of the saw. Fig. VII is a side elevation in section of the rear end portion of the saw and shows more particularly the device for moving a stave that is sawed from the bolt and drops internally of the saw forwardly and ejecting the stave from the saw at the saw's forward end. Fig. VIII is a view in perspective of the stave-ejector. Fig. IX is a transverse vertical section of the stave-thickness-controlling gage and shows means instrumental in tilting the said gage and also means that acts to retain the gage in its normal position. Fig. X is a transverse vertical section of the gage, more clearly showing the construction of the means employed in retaining the gage in its normal position. Fig. XI is a side elevation, largely in vertical longitudinal section, of the frame that supports the bolt-carriage, and, among other things, means employed in returning the bolt-carriage to its starting position after the sawing operation. The outer arms or brackets $g^2$ of the bolt-carriage are broken away in this figure. Fig. XII is an elevation in vertical section on line XII XII, Fig. XI, looking in the direction of the arrow. Fig. XIII is a vertical section on line XIII XIII, Fig. XII, looking in the direction of the arrow. Fig. XIV is a vertical section on line XIV XIV, Fig. XII, looking in the direction of the arrow. Fig. XV is a transverse vertical section on line XV XV, Fig. XI, looking in the direction of the arrow. Fig. XVI is a transverse vertical section on line XVI XVI, Fig. XI, looking in the direction of the arrow. Fig. XVII is a forward end elevation, partly in transverse section, showing a portion of the bolt-carriage, the adjacent portion of the saw, the stave-thickness-controlling gage arranged in its normal position or concentrically of the saw, and a bolt placed upon the bolt-carriage and being operated upon. Fig. XVIII is a forward end elevation, partly in vertical section, showing a portion of the bolt-carriage, the adjacent portion of the saw, a bolt upon the said carriage having been operated upon and having had several staves sawed therefrom, and the gage having tilted the bolt as required to remove a wedge-shaped or angular piece from the bolt, so as to render possible the conversion of the remainder of the bolt into staves without materially deviating from the sawing of the bolt upon lines approximately radially of the bolt.

Figs. XII to XVI, inclusive, are drawn on a corresponding scale that is larger than the scale employed in the preceding figures, and portions are broken away and in section here and there in the drawings to reduce the size of the drawings and to more clearly show the construction.

Our improved machine comprises a horizontally-arranged bed $a$. The bed $a$ comprises a metal casting sufficiently wide at its base to give stability and equilibrium to the machine. The sides of the bed slope upwardly and inwardly from the base, so that the bed is narrower at the top than at its base. The reduction of the width of the bed upwardly renders all the parts mounted upon the bed conveniently accessible. The bed, as shown in Figs. II and III, has each end thereof provided with a pedestal $a'$. The pedestals $a'$ and $a'$ are formed integral with the bed and arranged a suitable distance apart longitudinally of the bed.

The cylinder-saw of the machine consists of a barrel-shaped shell or cylinder $b$, that is serrated at one end in the usual manner. The saw is arranged horizontally and longitudinally of the bed and has its rear end closed by a head $b'$, that is operatively mounted in any approved manner upon the suitably-driven shaft $c$, that extends centrally and longitudinally through the cylinder of the saw and is consequently arranged horizontally and is supported at the ends of the saw by pillow-blocks $d$, that are supported from the pedestals of the bed. The head $b'$ is provided upon its inner or forward side with an annular recess or groove $b^2$, that is snugly engaged by the rear end of the cylindrical shell $b$, as shown in Fig. VII. The head $b'$ is provided at its periphery with an inwardly-projecting annular flange $b^3$, that snugly overlaps the outer side of the shell $b$ and is secured to the latter, preferably removably, by means of bolts or screws $b^4$, that are arranged with their heads abutting the external peripheral surface of the said flange and have their shanks engaging correspondingly-threaded holes formed in the aforesaid shell.

The bed $a$ is provided at the left-hand side, as shown in Fig. I, with laterally-projecting and upwardly-inclined arms or brackets $a^2$ and $a^2$, that are formed upon and integral with opposite ends, respectively, of the bed.

A generally rectangular frame $e$ is mounted upon the arms $a^2$ and is arranged longitudinally of and a short distance from the saw and extends a suitable distance forward of the forward end of the bed, and consequently forward of the saw. The upper or frame-bearing surfaces of the arms $a^2$ are arranged in the same inclined plane. The frame $e$ is composed, preferably, of a metallic casting and comprises two parallel side members $e'$ and $e'$, that extend longitudinally of the frame and are arranged at right angles to the frame-bearing surfaces of the arms $a'$. The frame $e$ comprises also two end members $e^2$ and $e^2$, that are arranged transversely of the frame at opposite ends, respectively, of the frame and that are arranged between and brace apart the side members $e'$ and $e'$. The frame $e$ comprises, furthermore, any suitable number of intermediate transversely-arranged members $e^3$, suitably spaced between the ends of the frame and bracing apart the side members $e'$ at suitable intervals between the ends of the frame. All of the said frame members— the side members $e'$, the end members $e^2$, and the intermediate transverse members $e^3$—are formed integral with each other, so as to form a structure of considerable stability notwithstanding the lightness conferred upon it by its largely hollow character. The frame $e$ is arranged opposite the lower portion of the saw and in the main below the axial line of the saw. The frame is rigidly secured to the arms $a^2$ of the bed and at its inner side—that is, at the outer side of its inner side member $e'$—rests against shoulders $a^3$, formed upon the said arms $a^2$. The frame $e$ is secured to the arms $a^2$, preferably removably, by means of bolts or screws $a^4$ extending through the said arms into the lower portion of the frame, as shown in Figs. I and III.

A track is formed upon the frame $e$ and comprises, preferably, two steel rails $f$ and $f$, that are arranged at opposite sides, respectively, of the frame and supported from and at the outer sides, respectively, of the frame and preferably supported from and at the outer side of the different side members, respectively, of the frame. The said track is arranged below the axis of the saw, and of course the inner rail of the track is arranged below the track's outer rail. Preferably each rail of the track rests upon a series of lugs $e^4$, that are formed upon and integral with the frame's side member $e'$, that supports the said rail, and are arranged at suitable intervals longitudinally of the said side member, and each rail above the rail-supporting lugs is secured to the lug-bearing member by a bolt or screw $f'$, as shown in Figs. I, IV, and V.

A bolt-carriage $g$ (a vehicle for carrying a bolt that is to be converted into staves to and from the saw and during the sawing operation) is mounted upon the rails $f$ and $f$ and is consequently arranged in an inclined plane that is parallel with the inclined plane in which the track is located. The bolt-carriage comprises the following members: two pairs of wheels $g'$ and $g'$, arranged at or near opposite ends, respectively, of the carriage, with the wheels of each pair of wheels engaging the different rails $f$ and $f$, respectively. The wheels $g'$ are suitably connected with arms or brackets $g^2$, depending from platforms $g^3$ and $g^4$, with which the carriage is provided—that is, the carriage comprises two platforms $g^3$ and $g^4$, that form opposite end portions, respectively, of the carriage and are provided at their inner ends with the depending arms or brackets $g^2$, to which the aforesaid wheels $g'$ are attached, as shown in Figs. I, III, and V. The bolt-carriage comprises also two tubular side bars $g^5$, that are arranged a suitable distance apart laterally and extend between and into the platforms $g^3$ and $g^4$ and constitute a connection between the platforms that are secured in any approved manner to the said bars. (See Figs. XI, XV, and XVI.) Two cross-bars $g^6$ and $g^7$ connect together and brace apart the tubular side bars of the carriage. The said cross-bars are arranged a suitable distance apart longitudinally of the carriage between the two platforms of the carriage. Each cross-bar has two eyes or sleeves $g^8$ and $g^8$, that embrace the different side bars $g^5$, respectively, and are suitably secured to the said bars $g^5$. The cross-bar $g^7$, that is nearer the forward end of the machine, may be permanently fixed to the side bars $g^5$; but the other cross-bar $g^6$, that is nearer the rear end of the machine, should be adjustable laterally—that is, longitudinally of the bolt-carriage—and is secured in the desired adjustment by set-screws $g^9$, that engage the side bars through correspondingly-threaded holes formed in the eyes or sleeves of the cross-bars. Hence the eyes or sleeves of the adjustable cross-bar form slides that engage the slideway, forming tubular side bars, and are secured in the desired adjustment of the cross-bar to the side bars by means of the aforesaid set-screws. Each cross-bar has its top provided with a comparatively thin work-bearing flange $g^{10}$, that is formed integral with and extends longitudinally of the said bar. The bolt that is to be sawed into staves rests upon the flanges $g^{10}$ of the said cross-bars.

Means for engaging and holding opposite ends of the bolt that is to be sawed into staves during the sawing operation is provided, as will hereinafter appear.

Means for preventing displacement of the bolt-carriage is provided and comprises the following: Each side member $e'$ of the carriage-bearing frame (see Figs. III and V) is provided at the top and upon its inner side with a flange $e^5$, that projects laterally and inwardly and extends longitudinally of the frame $e$. The flange $e^5$ of the inner side member $e'$ has its edge engaged by two wheels $g^{11}$ and $g^{11}$, that are arranged a suitable distance apart and supported from the different platforms, respectively, of the bolt-carriage (see also Fig. XI)—that is, each platform of the carriage is provided with a depending arm or bracket $g^{12}$, that bears a wheel $g^{11}$, that is arranged in a plane at right angles to the flange $e^5$ of the inner side member $e'$ of the frame $e$ and has its periphery engaging the edge of the said flange. The lower side of the flange $e^5$ of the outer side member $e'$ of the frame $e$ is engaged by the peripheral surfaces of two rollers or wheels $g^{13}$, that are arranged a suitable distance apart longitudinally of the bolt-carriage and are supported from the said carriage in any approved manner. (See Figs. I, III, and V.) Preferably the said wheels or rollers $g^{13}$ are supported from the different platforms, respectively, of the bolt-carriage (see also Fig. XI) and suitably attached to an arm or bracket $g^{14}$, depending from and rigid with the respective platform. The rollers or wheels $g^{13}$ are provided, respectively, with an external annular flange $g^{15}$, that overlaps the edge of the flange $e^5$ of the outer side member $e'$ of the frame $e$. The overlapping of the edge of the said flange $e^5$ by the flanges $g^{15}$ of the rollers or wheels $g^{13}$ prevents outwardly lateral displacement of the bolt-carriage. The engagement of the wheels $g^{11}$ with the flange $e^5$ of the inner side member $e'$ of the said frame $e$ prevents lateral displacement of the bolt-carriage in the direction of the saw, and the engagement of the rollers or wheels $g^{13}$ with the lower side of the flange $e^5$ of the outer side member $e'$ of the said frame $e$ prevents displacement of the carriage upwardly from the track and of course prevents tipping of the said carriage laterally and inwardly in the direction of the saw.

A gage instrumental in predetermining or regulating the thickness of the stave that is to be sawed from the bolt is provided and, as shown in Figs. I, II, III, IV, and V, comprises a segmental plate $h$, normally arranged concentrically of the saw between the bolt-carriage and the axial line of the saw and movable radially of the saw. The thickness of the stave that is to be sawed from the bolt will of course correspond to the space radially of the saw between the forward side of the gage and the inner periphery of the saw. The arrangement of the gage is, furthermore, such that its lower edge shall in its normal position be opposite or approximately opposite the inner ends of the bolt-bearing flanges $g^{10}$ of the bolt-carriage, so that the gage is arranged in the main above the inner side of the bolt-carriage. As shown in Fig. XVII, the first piece that is cut from a side of the bolt is waste, so far as making staves is concerned; but as soon as this piece is cut away the bolt is allowed to shift in the direction of the gage, and the side thus operated upon will then conform to the forward or working surface of the gage.

The gage in order to render it adjustable laterally and radially of the saw as required in sawing different thicknesses of staves upon one and the same machine is supported from a carriage that is supported, preferably, from and below the forward end portion of the frame $e$ forward of the bed of the machine and is movable transversely of the under side of the said frame in a plane that is parallel with the radial line of adjustment of the gage, and we would here remark that not only the gage-carriage, but the bolt-carriage and the frame $e$, that bears both of the said carriages, are preferably arranged in inclined planes parallel with the radial line of adjustment of the gage.

The gage-carriage comprises two suitably-operated slides $h'$ $h'$, that are arranged below and transversely of the frame $e$ forward of the machine's bed and are arranged, furthermore, a suitable distance apart longitudinally of the said bed. The slides $h'$ are supported in any approved manner and are movable transversely of the under side of the frame $e$ in an inclined plane parallel, as already indicated, with the radial line of adjustment of the gage. Each slide $h'$ terminates at its inner end in an upwardly and inwardly inclined upright arm $h^2$, to the upper end of which the gage-plate $h$ is secured in any approved manner—that is, the gage-plate $h$ is attached at its back side to the upper ends of the aforesaid arms of the slides, and consequently the gage is shifted radially of the saw in the one direction or the other, according as the aforesaid slides are moved endwise in the one or the other direction.

The means employed for operating the slides $h'$ (see Figs. I, IV, V, and VI) comprises, preferably, a manually-operated shaft $k$, that is arranged below the slide and longitudinally of the frame $e$ and has bearing in two pairs of boxes $j$, formed below the different slides, respectively, and supported from or formed upon the frame $e$. The boxes of each pair of boxes $j$ are arranged the distance apart required to accommodate a free interposition between them of a pinion $k'$, that is operatively mounted upon the shaft $k$ and engages a rack $h^3$, suitably secured to or formed upon the under side of the slide $h'$, that is arranged next above the said pair of boxes. The slideways $e^7$ for the slides $h'$ are formed, preferably, next above the boxes $j$, that afford bearing for the shaft $k$, as illustrated in Fig. VI, that shows one of the pairs of boxes $j$, the slide next above the same, and the operative connection between the slide and the shaft, and it will be observed that the upper ends of the boxes are instrumental in the formation of the said slideways $e^7$. The side walls of each slideway $e^7$ are formed by a cap $e^6$, that straddles the slide engaging the said slideway, which cap is preferably formed integral with the frame $e$. Each cap $e^6$ is instrumental in excluding the ingress from above of dust and dirt to the slideway $e^7$, that is formed therein, and is provided with any suitable number of apertures $e^8$ for conducting oil or lubricant to the slideway. The space containing the pinion and rack between the boxes of each pair of boxes $j$ is closed at the bottom by a cover $i$, that prevents the ingress from below of dust and dirt to the said space.

Obviously the gage-bearing slides are actuated in the one direction or the other, according as the shaft $k$ is turned in the one or the other direction. The shaft $k$ is provided at its outer end with a lever $k^2$, (see Figs. I, II, and IV,) that is operatively connected by means of a link $k^3$ with the hand-lever $k^4$, that is fulcrumed, as at $k^5$, to a bracket $e^9$, with which the forward end of the frame $e$ is provided. The lever $k^4$ is provided with a bolt $k^6$, adapted to engage a notch of a series of notches $e^{11}$, formed in the stationary segment $e^{10}$, that is fixed to or formed upon the lever-bearing bracket $e^9$ in any approved manner. A suitably-applied spring $k^7$ acts to retain the bolt $k^6$ in its operative position, and a lever $k^8$, that is operatively connected with the said bolt, is fulcrumed to the lever and arranged as required to render it capable of rendering the bolt inoperative against the action of the spring $k^7$. Obviously, therefore, the tilting of the lever $k^4$ in the one direction or the other upon rendering and holding the bolt inoperative will result in the rotation of the shaft $k$ in the one or the other direction.

Although the bolt will in sawing the staves tip against the gage-plate $h$ upon placing the bolt upon the bolt-carriage, the bolt has its ends seized or held during the sawing operation by two dogs $l$ and $m$, that are supported from the different platforms $g^3$ and $g^4$, respectively, of the bolt-carriage and are arranged vis-á-vis, so as to render them capable of firmly seizing a bolt interposed between them and prevent the weight of the bolt coming on the gage-plate. The dog nearest the rear end of the machine—viz., the dog $l$—is adjustable longitudinally of the bolt-carriage, as shown in Figs. XI and XVI, wherein the said dog is formed upon a slide $l'$, that is arranged longitudinally of the bolt-carriage and engages a slideway $g^{16}$, formed upon the said carriage in any approved manner. The dog $l$ is secured in the desired adjustment by any suitable number of set-screws $l^2$, that engage with the dog-slide $l'$ through correspondingly-threaded holes formed in one of the side walls of the slideway $l^6$. The dog nearest the forward end of the machine— viz., the dog $m$—is shifted longitudinally of the carriage as required to render it capable of being moved into engagement with or withdrawn from the bolt. The dog $m$, as shown in Figs. XI and XIV, is formed upon one end of a rack $m'$, that is arranged horizontally and longitudinally of the bolt-carriage. The rack $m'$ has its teeth formed upon its upper side and rests upon the bottom of a slideway $g^{17}$, that is formed upon the bolt-carriage in any approved manner. A manually-operated shaft $m^2$ is arranged above and transversely of the rack $m'$ and is supported from the bolt-carriage in any approved manner and is operatively provided at one end (see Fig. XII) with a hand-wheel $m^3$ for turning the same. A pinion $m^4$ (see Figs. XII and XIV) is operatively mounted upon the shaft $m^2$ and meshes with the rack $m'$. Obviously, therefore, the dog-bearing rack $m'$ is shifted longitudinally in the one direction or the other, according as the shaft, by means of its hand-wheel $m^3$, is turned in the one or the other direction. Obviously by means of the adjustability of the two dogs $l$ and $m$ toward and from each other different lengths of bolts are readily accommodated. Therefore the adjustability of the rear cross-bar $g^6$ of the bolt-carriage longitudinally of the carriage is important when the length of the bolt is such as to require the shifting of the dog $l$ toward the forward end of the machine. Upon placing the bolt that is to be sawed into staves in position upon the bolt-carriage the dogs $l$ and $m$ are adjusted as required relative to the bolt; but the bolt must move in the direction of the gage after the cutting of each stave or strip from the bolt, and consequently means for effecting a slight movement of the dog-bearing rack $m'$ to render the dog $m$ capable of releasing and rebiting the bolt preparatory to the commencement of each sawing operation is provided, and comprises, preferably, a sleeve $m^5$, (see Figs. XII and XIII,) that is loosely mounted upon the shaft $m^2$ and has a hand-lever $m^6$ for turning the sleeve, and a mutilated or segmental gear or pinion $m^7$ is operatively mounted upon the sleeve $m^5$ next to the pinion $m^4$ and is arranged as required to render it capable of engaging and actuating the rack $m'$ to a limited extent upon a proper manipulation of the sleeve-lever $m^6$.

A buffer $n$, that is shown only in Fig. XI, is supported from the forward end of the frame $e$ and is adjustable, preferably, longitudinally of the said frame. The buffer comprises, preferably, a metallic plate $n'$, corrugated transversely upon its lower side and engaging the correspondingly-corrugated upper surface of a block $n^2$, that is suitably secured to the forward end of the frame $e$. A bolt or screw $n^3$ extends vertically through the buffer-plate $n'$ and engages a correspondingly-threaded hole formed in the block $n^2$. The buffer-plate's hole $n^4$, through which the screw $n^3$ extends, is elongated longitudinally of the plate to accommodate the longitudinal adjustment of the buffer, and a washer $n^5$, that is interposed between the head of the screw $n^3$ and the upper side of the said plate $n$, coöperates with the said screw in securing the buffer in the desired adjustment. The buffer-plate has its inner end provided with the buffer proper, that is composed of a block $n^6$, of rubber or other elastic material, and projects beyond the inner end of the plate and is held in place in any approved manner. In its starting position the bolt-carriage is arranged next to the buffer and has its outer end engaging the buffer proper.

The bolt-carriage is manually actuated in the direction of the saw during the sawing operation and is provided with a handle $g^{18}$, as shown in Figs. I and II for the said purpose.

A rod $o$ (see Figs. III and XI) is arranged between the side members $e'$ and $e'$ of the frame $e$ and is stationary, being supported from one of the said side members. A cylindrical case $p$ is mounted upon and arranged to slide endwise of the rod $o$. A spiral spring $o'$ is confined upon the rod $o$ within the case $p$ and is interposed, preferably, between the forward end or head $p'$ of the case and an annular shoulder $o^2$, formed upon the rod $o$ within the rear end of the case. The spring-containing case $p$ is provided at or near its rear end with an upright arm $p^2$, that is fixed to the case in any approved manner and projects upwardly into the path of the bolt-carriage, and the arrangement of the parts is such that the bolt-carriage when actuated during the sawing operation will engage and thereupon actuate the arm $p^2$ and the spring-containing case $p$, connected therewith, against the action of the spring $o'$, so that upon the completion of the sawing operation when a stave has been sawed from the bolt the spring will be compressed or under tension and upon then leaving go of the handle $g^{18}$ of the bolt-carriage will return the said carriage to its starting position. The arrangement of the parts is preferably such that the spring will not be compressed until the bolt-carriage has been actuated part way, preferably about half-way, during the sawing operation, so that the bolt-carriage shall not strike the buffer with too much force upon its return by the action of the spring into its starting position.

Each stave or piece that is sawed from the bolt drops, upon the completion of the sawing operation, internally of the cylinder of the saw, into the trough $t$, that is arranged within and extends longitudinally of the said cylinder between the path of the bolt-carriage and the axial line of the saw. (See Figs. II, III, and VII.) The trough $t$ is formed in any approved manner and is suitably supported from or secured to the forward pedestal of the bed $a$. The outer side wall $t'$ of the trough extends into close proximity to the inner peripheral surface of the saw's cylinder. The inner side wall $t^2$ of the trough $t$ is arranged concentrically or approximately concentrically of the saw. An upright plate $r$, employed to eject or remove from the trough $t$ a stave dropping into the trough, is provided and extends from side to side and from top to bottom of the trough. The stave-ejector $r$ is provided at its upper end with a forwardly-extending shank-forming rod $r'$, that is attached at its outer end, in any approved manner, to an arm or bracket $g^{19}$, formed upon and rigid with the bolt-carriage, which bracket or arm extends to the shank of the stave-ejector over the gage $h$, so as to avoid interference with the location and operation of the said gage.

An important feature of our improved machine consists in reducing the friction between the stave-ejector and the stave-receiving trough to a minimum, and, as shown in Figs. III and VII, the stave-ejecting plate $r$ does not rest upon the bottom of the trough, but is supported exclusively from a head $t^3$, formed upon the top and extending longitudinally of the inner side wall $t^2$ of the trough $t$. The plate $r$ has its upper end provided with a half-sleeve $r^2$, that constitutes a slide or carriage that straddles and is adapted to move upon and endwise of the head $t^3$ during the actuation of the stave-ejector when the bolt-carriage is returning to its starting position after the sawing operation. The arrangement of the parts is such, therefore, that a stave or piece sawed from the bolt drops into the trough $t$ forward of the stave-ejector $r$ and is removed by the latter from the trough during the return of the bolt-carriage into its starting position.

By the construction hereinbefore described it will be observed that the bolt-carriage and the stave-carriage and other parts carried by the said carriages are supported from one and the same framework—viz., from the frame $e$—and consequently there is no liability of any of the said parts settling or otherwise becoming displaced independently of the remainder of the said parts. In the assemblage of the parts during the erection of the machine it is only necessary to have the frame $e$ and the saw properly adjusted relative to each other, and the simpler way is to adjust the saw relative to the said frame $e$. To accommodate this adjustment of the saw and to accommodate the employment of saws differing in diameter, respectively, the pillow-blocks $d$, that afford bearing for the saw-bearing shaft $c$, are adjustable laterally of the bed toward and from the frame $e$, and the pillow-block $d$ of each pedestal $a'$, as shown in Fig. III, is seated, therefore, upon the bottom of a recess $a^5$, formed in the upper end of the said pedestal, and is provided with two set-screws $d'$ and $d'$, that are arranged in line at opposite sides, respectively, of the block and adapted to engage the different end walls, respectively, of the aforesaid recess $a^5$ in the desired adjustment of the saw. By properly manipulating the set-screws $d'$ the pillow-blocks, and consequently the saw-bearing shaft and the saw supported therefrom, can be adjusted as required to properly adjust the saw relative to the bolt-carriage. When the saw has been properly adjusted relative to the bolt-carriage, each pillow-block is secured in the desired adjustment by a bolt $d^2$ and nut $d^3$, with which the said block is provided. The bolt $d^2$ extends vertically through the pillow-block and has its head engaging the top of the said block. The nut $d^3$, that is mounted upon the correspondingly-threaded shank of the said bolt, is arranged within a recess or slot $a^6$, formed within the pedestal that supports the said pillow-block and extending transversely of the bed of the machine. The nut is arranged, therefore, to engage the top wall of the said slot or recess $a^6$. The nut-bearing bolt extends loosely through a correspondingly-arranged hole $a^7$, that is formed in the said wall and communicates with the slot or recess $a^6$, and is elongated longitudinally of the slot or recess $a^6$ to accommodate the location of the bolt $d^2$ during the adjustment of the saw. Obviously each pillow-block is firmly secured in the desired adjustment by tightening the bolt $d^2$ and the nut $d^3$, with which the said block is provided.

To prevent injury, during the operation of the saw, to a person employed or engaged at or near the saw's side that is opposite to the machine's side that carries the bolt-carriage from the serrated end of the saw or from the exposed heads of the bolts or screws employed in securing the cylindrical shell of the saw to the shell-bearing head $b'$, two saw-guards $s$ and $s$ are provided at the said side of the saw and at opposite ends, respectively, of the saw. The two saw-guards are supported from different levers $s'$ and $s'$, respectively, that are fulcrumed at their lower ends, as at $s^2$, to the pedestals of the bed. The fulcrums of the guard-levers have their axes coincident and are arranged longitudinally of the bed, and the levers are connected by a rod or bar $s^3$, by which the said levers and the guards borne thereby can be simultaneously swung toward or from the saw. In Fig. II the said guards are shown swung from the saw. In Fig. III the guards are swung toward the saw and are locked in their operative position by a latch $u$, that is formed upon the inner end of an oscillating shaft $u'$, that is supported from the forward guard-lever and is provided with a hand-lever $u^2$. The latch in its operative position, as shown in Fig. III, engages the adjacent end wall of the pillow-block-containing recess $a^5$ of the forward pedestal, and obviously the said latch is rendered inoperative or operative, according as the latch-bearing shaft is oscillated in the one or the other direction. Guard-locking means substantially as that hereinbefore described may be provided at the rear end of the saw.

In Figs. XVII and XVIII, $x$ designates a bolt that is being operated upon. The bolt is placed upon the bolt-carriage with its thicker portion down. As already indicated, the first piece cut from the bolt is waste. The dotted lines (marked $x'$) in Fig. XVIII designate the outer or convex surface of three staves that are to be cut from the bolt. Obviously when the third stave has been sawed from the bolt one or more wedge-shaped pieces can be sawed off to advantage, as indicated in Fig. XVII, without wasting any of the bolt, so far as the number of staves obtainable from the bolt is concerned, and avoiding sawing of the bolt materially out of line radially of the bolt. To accommodate the removal of the surplus of material from the central portion of the lower or thicker part of the bolt after sawing several staves from the bolt, the gage-plate $h$, employed in the regulation of the thickness of the staves, is hinged at its lower edge horizontally and longitudinally of the gage, so as to render the gage-plate capable of being tilted forwardly or laterally in the direction of the bolt-carriage, and when the gage-plate is thus tilted, as shown in Fig. XVIII, after sawing several staves from the bolt it will be observed that the surplus of material at or near the lower central portion of the bolt can be readily removed. In Fig. XVIII the bolt is in position to have a wedge-shaped piece cut therefrom.

The means employed in securing the gage-plate $h$ to each arm $h^2$ of the gage-carriage (see Figs. IV and X) comprises a bolt $h^4$ and a nut $h^5$. The bolt $h^4$ extends loosely through a hole formed in the respective arm into the channel $h^6$, formed within and extending longitudinally of the back side of the gage-plate, centrally between the lower and upper edges of the said plate. Opposite side walls of the said channel $h^6$ are undercut, and the bolt $h^4$ is arranged with its head engaging the enlarged portion of the channel between the undercut portions of the said walls, and a spiral spring $v$ is mounted and confined upon the bolt between the outer side of the aforesaid arm $h^2$ and the nut $h^5$, mounted upon the correspondingly-threaded shank of the said bolt. The springs upon the bolts $h^4$ obviously act to retain the gage-plate in its normal position, wherein its face or forward side extends concentrically of the saw, as already indicated.

The hinge connection between the gage-plate and the arms $h^2$ of the gage-carriage is formed, preferably, as follows: Two corresponding plates $h^7$ and $h^7$ are arranged a suitable distance apart between and at or near the different arms $h^2$ and $h^2$, respectively. Each plate $h^7$ is secured to the back side of the gage-plate by means of a bolt $h^8$ and a nut $h^9$. The bolt $h^8$ is arranged with its head engaging the inner and enlarged portion of the channel $h^6$, as shown in Fig. IV, and extends through the end plate $h^7$, and the nut $h^9$ is mounted upon the bolt's shank at the outer side of the said plate. Each plate $h^7$ terminates at its lower end in an eye or sleeve $h^{10}$. The sleeves or eyes $h^{10}$ of the two plates $h^7$ are arranged in line and embrace opposite end portions, respectively, of the pintle $h^{11}$ of the aforesaid hinge connection. The pintle $h^{11}$ between the plates $h^7$ is embraced by a sleeve $h^{12}$, that is provided upon its lower side with two flanges $h^{13}$ and $h^{13}$, that project beyond opposite ends, respectively, of the said sleeve and are rigidly secured to the different arms $h^2$ and $h^2$, respectively.

Means for locking the gage in its normal position is provided and comprises, preferably, two lugs $h^{14}$ and $h^{14}$, projecting laterally from opposite ends, respectively, of the sleeve $h^{12}$ in the direction of the axial line of the saw. Each lug $h^{14}$ has its outer end provided with a shoulder $h^{15}$, (see Figs. IV, V, and IX,) that faces in the direction of the axial line of the saw and is engaged by the hook-forming end of a latch $w$, operatively mounted upon an oscillating shaft $w'$, that is arranged horizontally and longitudinally of the back side of the gage-plate and has bearing in two boxes $h^{16}$ and $h^{16}$, formed upon the different plates $h^7$ and $h^7$, respectively. The shaft $w'$ is provided with a hand-lever $w^2$, that curves rearwardly of and over the top of the gage-plate. Obviously the latches $w$ are rendered operative or inoperative, according as the shaft $w'$, by means of the lever $w^2$, is turned in the one direction or the other. The latches $w$ are of course held and rendered inoperative preparatory to the tilting of the gage forwardly, as hereinbefore described. The hand-lever $w^2$ is also employed in tilting the gage-plate, and to render this possible the shaft $w'$ is provided with two lugs $w^3$ and $w^3$, arranged a suitable distance apart longitudinally of the shaft and arranged, furthermore, as required to render them capable of engaging a shoulder $h^{17}$, formed upon the back side of the gage-plate when the lever has been actuated the distance required to render the latches inoperative, so that the further actuation of the lever in the same direction shall result in the aforesaid tilting of the gage against the action of the springs $v$.

What we claim is—

1. In a machine of the character indicated, the combination, with the stationary bed of the machine, the cylinder-saw, supported from the said bed, the bolt-carriage for actuating the stave-bolt, that is to be operated upon, longitudinally of the saw, and a frame bearing the said carriage and rigid with the bed, of a gage-plate arranged forward and concentrically of the saw between the bolt-carriage and the saw's axial line, a carriage bearing the said plate and arranged below and having a travel at right angles to the travel of the bolt-carriage and being supported from the aforesaid frame, and means for actuating the gage-carriage in opposite directions, and the arrangement of parts being such that the gage-plate is actuated radially of the saw in the one direction or the other according as the gage-carriage is moved in the one or the other direction.

2. In a machine of the character indicated, the combination, with the stationary bed of the machine, the cylinder-saw supported from the said bed, the bolt-carriage having a travel outside of and longitudinally of the saw, and the frame bearing the bolt-carriage and rigid with the aforesaid bed, of a gage-plate arranged forward and concentrically of the saw between the path of the bolt-carriage and the axial line of the saw, two slides supported from the aforesaid frame below and arranged and movable at right angles to the travel of the bolt-carriage and having upright arms bearing the aforesaid plate, and means for actuating the said slides simultaneously, and the arrangement of parts being such that the aforesaid gage-plate is shifted radially of the saw in the one direction or the other according as the aforesaid slides are actuated in the one or the other direction.

3. In a machine of the character indicated, the combination, with the stationary bed of the machine, the cylinder-saw supported from the bed, the bolt-carriage arranged and movable outside of and longitudinally of the saw, and the frame bearing the said carriage and rigid with the bed, of a gage-plate arranged forward and concentrically of the saw between the travel of the bolt-carriage and the axial line of the saw, two slides arranged below and at right angles to the travel of the bolt-carriage, slideways formed upon and at the lower side of the aforesaid frame, racks formed upon the lower sides of the said slides, a shaft supported from the said frame, pinions operatively mounted upon the shaft and meshing with the racks, and means for turning the shaft, substantially as and for the purpose set forth.

4. In a machine of the character indicated, the combination, with the stationary bed of the machine, the cylinder-saw supported from the bed, the bolt-carriage arranged and movable outside of and longitudinally of the saw, and a frame bearing the said carriage and rigid with the bed, of a gage-plate arranged forward and concentrically of the saw between the saw's axial line and the path of the bolt-carriage, two slides arranged a suitable distance apart below and at right angles to the path of the bolt-carriage, slideways formed upon the aforesaid frame for the said slides, racks formed upon the lower sides of the slides, a pinion-bearing shaft supported from the said frame and having its pinions meshing with the racks and provided with a lever, the hand-lever fulcrumed to the aforesaid frame, a link operatively connecting the hand-lever with the aforesaid shaft-lever, and means for locking the hand-lever in the desired adjustment, substantially as shown, for the purpose specified.

5. In a machine of the character indicated, the combination, with a cylinder-saw and the bolt-carriage arranged to move outside and longitudinally of the saw, of a gage-plate arranged outside and concentrically of the saw between the saw's axial line and the path of the bolt-carriage and adjustable radially of the saw, the frame or support that bears the gage-plate, and a hinge connection between the plate and its support and comprising sleeves formed upon the plate and the plate's support and arranged in line horizontally of and at or near the lower edge of the plate at the back side of the plate, and the pintle or pin forming the axial connection between the said sleeves.

6. In a machine of the character indicated, the combination, with the cylinder-saw, and the bolt-carriage arranged and movable outside and longitudinally of the saw, of a gage-plate arranged forward and concentrically of the saw between the saw's axial line and the path of the bolt-carriage and adjustable radially of the saw, the frame or support that bears the gage-plate, a hinge connection between the plate and its support and formed by a horizontally-arranged sleeve formed upon the plate's support longitudinally of and at or near the lower edge of the plate, and two ears or sleeves arranged in line with the first-mentioned sleeve and formed upon the back side of the plate, and the pintle extending within and longitudinally of the said sleeves.

7. In a machine of the character indicated, the combination, with the cylinder-saw, the bolt-carriage arranged and movable outside and longitudinally of the saw, and a gage-plate arranged forward and concentrically of the saw between the saw's axial line and the path of the bolt-carriage, the frame or support that bears the said plate, and such a hinge connection between the gage-plate and its support, at the plate's lower edge, as will render the plate capable of being tilted laterally toward the path of the bolt-carriage, of a shaft supported and arranged longitudinally of the back side of the gage-plate, a lever operatively mounted upon the shaft and an arm formed upon the shaft and arranged to engage the back side of the gage-plate upon moving the lever in the required direction.

8. In a machine of the character indicated, the combination, with a cylinder-saw, the bolt-carriage arranged and movable outside and longitudinally of the saw, and a gage-plate arranged forward and concentrically of the saw between the saw's axial line and the path of the bolt-carriage, the frame or support that bears the gage-plate, and such a hinge connection between the said plate and its support, at the plate's lower edge, as will render the plate capable of being tilted laterally toward the path of the bolt-carriage, of a shaft supported from and arranged longitudinally of the back side of the gage-plate, a lever operatively mounted upon the shaft and extending upwardly above the gage-plate, and arms formed upon the shaft and arranged to engage the back side of the gage-plate upon moving the lever toward the path of the bolt-carriage.

9. In a machine of the character indicated, the combination, with the cylinder-saw, the bolt-carriage arranged and movable outside and longitudinally of the saw, a gage-plate normally arranged forward and concentrically of the saw between the saw's axial line and the path of the bolt-carriage, the frame or support that bears the said plate, and such a hinge connection between the gage-plate and its support, at the plate's lower edge, as will render the plate tiltable laterally toward the path of the bolt-carriage, of a shaft supported from and arranged longitudinally of the back side of the gage-plate, a lever operatively mounted upon the shaft, a projection formed upon the gage-support behind the gage below the shaft, and a latch operatively mounted upon the shaft and arranged to engage and overlap the outer end of the aforesaid projection in the normal position of the gage-plate, substantially as and for the purpose set forth.

10. In a machine of the character indicated, the combination, with the cylinder-saw, the bolt-carriage arranged and movable outside and longitudinally of the saw, a gage-plate normally arranged forward and concentrically of the saw between the saw's axial line and the path of the bolt-carriage, the frame or support that bears the said plate, such a hinge connection between the gage-plate and its support at the plate's lower edge as will render the plate tiltable laterally toward the path of the bolt-carriage, of a shaft supported from and arranged longitudinally of the back side of the gage-plate, a hand-lever operatively mounted upon the said shaft, two projections formed upon the gage-support behind the gage below the shaft and a suitable distance apart, and latches operatively mounted upon the shaft and arranged to engage and overlap the outer ends of the aforesaid projections in the normal position of the gage-plate, substantially as and for the purpose set forth.

11. In a machine of the character indicated, the combination, with the cylinder-saw, and the bolt-carriage arranged and movable outside and longitudinally of the saw, a gage-plate arranged forward and normally concentrically of the saw between the saw's axial line and the path of the bolt-carriage, the frame or support that bears the said plate, and such a hinge connection between the gage-plate and its support at the plate's lower edge as will render the plate tiltable laterally toward the path of the bolt-carriage, of two suitably-applied springs arranged at the back side and a suitable distance apart longitudinally of the gage and acting to retain the gage in its normal position.

12. In a machine of the character indicated, the combination, with the cylinder-saw, and the bolt-carriage arranged and movable outside of and longitudinally of the saw, a gage-plate arranged forward and normally concentrically of the saw and between the saw's axial line and the path of the bolt-carriage, the frame or support that bears the said plate and is arranged at the back side of the plate, and such a hinge connection between the gage-plate and its support at the plate's lower edge as will render the plate capable of being tiltable laterally toward the path of the bolt-carriage, of bolts connected with the back side of the gage and extending through the gage-support, and springs confined upon the said bolts at the outer side of the gage-support and acting to retain the gage-plate in its normal position.

13. A machine of the character indicated, comprising a cylinder-saw, the bed supporting the saw, a frame *e* arranged alongside and longitudinally of the saw and comprising two side members *e'* and *e'* arranged a suitable distance apart and provided, respectively, with, an inwardly and laterally projecting flange extending longitudinally of the frame, a track having its rails formed upon the outer side of the different side members *e'* and *e'*, respectively, a bolt-carriage having wheels engaging the said rails, other wheels having their peripheries engaging the flange of the inner side member *e'*, and rollers or wheels having their peripheries engaging the lower side of the flange upon the other side member *e'*, substantially as and for the purpose set forth.

14. A machine of the character indicated, comprising a cylinder-saw; the bed supporting the saw; a frame rigid with the bed at one side of the saw, which frame is arranged longitudinally of the saw and comprises the two side members *e'* and *e'* arranged a suitable distance apart laterally and inclined in the direction of the saw, and a flange formed at the top and extending longitudinally of the outer member *e'*; a track having its rails formed upon the outer side of the different members *e'* and *e'*, respectively; the bolt-carriage having wheels engaging the said track; means for preventing displacement of the carriage laterally in the direction of the saw; wheels supported from the carriage and engaging the under side of the aforesaid flange and having external annular flanges arranged to coöperate with the edge of the said flange in preventing outwardly lateral displacement of the carriage.

15. A machine of the character indicated, comprising a cylinder-saw; the bed supporting the saw; a frame rigid with the bed at one side of the saw, which frame is arranged longitudinally of the saw and comprises the two side members $e'$ and $e'$ arranged a suitable distance apart laterally and inclined toward the saw, and provided, respectively, upon the outer side, with a series of lugs arranged at suitable intervals longitudinally of the frame; a rail-forming bar mounted upon the series of lugs of each member $e'$; the bolt-carriage having wheels engaging the said rails; means for preventing displacement of the carriage in the direction of the saw, and means for preventing displacement of the carriage upwardly from the rails.

16. In a machine of the character indicated, the combination, with the cylinder-saw, the bolt-carriage arranged and movable at one side and longitudinally of the saw, and the track engaged by the said carriage, of a rod arranged below and longitudinally of the path of the carriage and provided with an external shoulder, a spiral spring mounted upon the said rod and arranged to bear, at one end, against the said shoulder, a case or cover externally of the spring and arranged to bear against the opposite end of the spring and having an arm arranged to be engaged and actuated by the bolt-carriage during the travel of the said carriage during the sawing operation.

17. In a machine of the character indicated, the combination, with a cylinder-saw, the bolt-carriage arranged and movable at one side and longitudinally of the saw, and the track engaged by the said carriage, of a stationary rod $o$ arranged below and longitudinally of the path of the carriage and provided with the shoulders $o^2$, the spiral spring $o'$ upon the said rod, and the case $p$ having the head $p'$ and the arm $p^2$, all arranged and operating substantially as shown, for the purpose specified.

18. In a machine of the character indicated, the combination, with the horizontally or approximately horizontally arranged shaft, a cylinder-saw operatively mounted upon the shaft, the bolt-carriage arranged to move longitudinally and at one side of the saw, and the support for the bolt-carriage, of a trough arranged within and longitudinally of the saw between the shaft and the bolt-carriage, a track-forming rail mounted or formed upon the upper portion of the inner side wall of the trough, and the stave-ejector arranged to operate within and endwise of the trough, which ejector is operatively connected with the bolt-carriage and is provided with a member that is mounted upon and movable endwise of the aforesaid rail.

19. In a machine of the character indicated, the combination, with the horizontally or approximately horizontally arranged shaft, the cylinder-saw operatively mounted upon the shaft, the bolt-carriage arranged to move longitudinally of the saw at one side of the latter, and the support for the bolt-carriage, of a trough arranged within and longitudinally of the saw, between the shaft and the bolt-carriage, of a track-forming rail mounted or formed upon the upper portion of the inner side wall of the trough, and the stave-ejector arranged to operate within and endwise of the trough, which ejector is operatively connected with the bolt-carriage and is provided with a half-sleeve slidably mounted upon the aforesaid rail.

20. In a machine of the character indicated, the stationary bed $a$ having the pedestals $a'$ and $a'$ and the two laterally-projecting and upwardly-inclined arms or brackets $a^2$ and $a^2$; a rectangular frame $e$ removably mounted upon and rigid with the said arms and arranged longitudinally of and a short distance from the saw and extending forwardly of the forward end of the bed and forward of the saw, which frame is composed of a single casting forming two parallel side members $e'$ and $e'$ that extend longitudinally of the frame and are arranged at right angles to the frame-bearing surface of the aforesaid arms; the track-forming rails $f$ and $f$ supported from the outer side of the different aforesaid side members, respectively, and arranged longitudinally of the said side members; the bolt-carriage mounted upon and movable endwise of the said rails; the cylinder-saw supported from the aforesaid pedestals and arranged longitudinally of the path of the bolt-carriage and adjustable laterally toward and from the carriage; means for securing the saw in the desired adjustment, and a gage arranged forward and concentrically of the saw between the saw's axial line and the path of the bolt-carriage and supported from the aforesaid frame.

Signed by us at Cleveland, Ohio, this 29th day of January, 1900.

RUDOLPH P. GERLACH.
  FRANK STAHL.

Witnesses:
  C. H. DORER,
  A. H. PARRATT.